United States Patent [19]

Sartorio et al.

[11] Patent Number: 5,192,260
[45] Date of Patent: Mar. 9, 1993

[54] APPARATUS FOR TRANSFER OF A MACHINE PART

[75] Inventors: Franco Sartorio; Mario Scavino; Stefano Vergano, all of Turin, Italy

[73] Assignee: Amada Company, Limited, Japan

[21] Appl. No.: 612,576

[22] Filed: Nov. 14, 1990

[30] Foreign Application Priority Data

Nov. 14, 1989 [IT] Italy .................. 67998 A/89

[51] Int. Cl.[5] ........................................... B23Q 3/00
[52] U.S. Cl. .................................................. 483/59
[58] Field of Search ............ 29/568, 568 CJ, 267, 29/270, 278, 568 M; 294/82.35, 119.1, 86.2, 86.27, 93, 100, 158; 414/741, 908; 72/422; 483/59

[56] References Cited

U.S. PATENT DOCUMENTS

| | | | |
|---|---|---|---|
| 2,281,103 | 4/1942 | MacDonald | 294/93 |
| 3,170,322 | 2/1965 | Cavanaugh | 294/119.1 |
| 3,744,125 | 7/1973 | Schalles | 29/568 CJ |
| 4,359,814 | 11/1982 | Pihery | 483/59 |
| 4,620,362 | 11/1986 | Reynolds | 29/568 |
| 4,676,541 | 6/1987 | Lord et al. | 294/119.1 |
| 4,698,898 | 10/1987 | Horsch | 29/568 |
| 4,720,907 | 1/1988 | Rapp | 29/568 |
| 4,852,242 | 8/1989 | Tella et al. | 483/59 |
| 4,892,344 | 1/1990 | Takada et al. | 294/119.1 |
| 5,017,084 | 5/1991 | Lemelson | 29/568 |
| 5,035,566 | 7/1991 | Sartorio et al. | 72/422 |

FOREIGN PATENT DOCUMENTS

| | | |
|---|---|---|
| 0190673 | 7/1988 | European Pat. Off. . |
| 0291828 | 11/1988 | European Pat. Off. . |
| 2536671 | 3/1976 | Fed. Rep. of Germany . |
| 137676 | 9/1979 | Fed. Rep. of Germany . |
| 3234675 | 3/1984 | Fed. Rep. of Germany ........ 483/59 |
| 8804107 | 6/1988 | Fed. Rep. of Germany . |
| 56-126549 | 10/1981 | Japan . |
| 1284441 | 11/1989 | Japan ..................... 29/568 |
| 1323375 | 7/1987 | U.S.S.R. ............... 414/741 |
| 1445954 | 12/1988 | U.S.S.R. ............... 294/119.1 |
| 2211170 | 6/1989 | United Kingdom . |

Primary Examiner—John Sipos
Assistant Examiner—Donald M. Gurley
Attorney, Agent, or Firm—Wigman & Cohen

[57] ABSTRACT

An apparatus for transferring a machine part, with a frame body, a pair of machine part gripper members each supported on the frame body for sliding in predetermined direction, a resilient member for energizing the pair of machine part gripper members to move toward each other. Also disclosed is a gripper member movement mechanism for disengaging the pair of gripper members against the resilient force of the resilient members and a gripper member lock mechanism for locking the movement of the gripper members when the gripper members are at a predetermined distance from each other.

10 Claims, 4 Drawing Sheets

APPARATUS FOR TRANSFER OF A MACHINE PART

BACKGROUND OF THE INVENTION

1. Field of the Invention

The present invention relates to an apparatus for transfer of a machine part.

2. Description of the Prior Art

Japanese Unexamined Patent Publication Tokkai-Hei 1-284,441 entitled: "Manipulator for a plate bending machine and a robotic device equipped with the manipulator", discloses a method for the replacement of a plurality of fingers (gripper members) of a plate clamping device forming part of a manipulator adapted to handle metal sheets to be processed in a bending press.

Conventionally, the fingers are replaced by means of an auxiliary arm which withdraws fingers of the desired type from a magazine, removes the fingers to be replaced from the plate clamping device, mounts the fingers previously withdrawn from the magazine on the plate clamping device, and deposits the removed fingers in the magazine for subsequent use. These operations are possible because the fingers are secured to the plate clamping device and to associated supports of the magazine by means of a passive snap-engageable securing device comprising a male/female support and guide means, for example, defined by a tang projecting from the fingers and connectable slidably with an associated seat on respective brackets carried by the plate clamping device or by the associated supports of the magazine, and respective locking pins retractable against the action of a resilient means, capable of snap-engaging appropriate holes in the tangs of the fingers to lock them axially onto the brackets.

This automatic system, whilst being highly efficient, requires a rather onerous and highly accurate programming of the control unit, involving complex movements, and further involves the additional cost of the finger displacement/manipulation arm. It is therefore used most advantageously in large or medium scale production in which the higher costs are divided over a large number of products. In smaller scale production it would however be preferable to replace the fingers manually.

SUMMARY OF THE INVENTION

Generally, it is an object of the present invention to provide an apparatus by means of which delicate machine part can be transferred without any risk of accidentally releasing them.

Specifically, it is an object of the present invention to provide an apparatus which permits an operator to rapidly, easily and in complete safety replace the fingers of a plate clamping device of a manipulator on which the fingers are secured to the plate clamping device by means of the same passive snap-engageable securing device, previously described, utilized in the automatic replacement system.

The objects are achieved in the present invention by the provision of an apparatus for transferring a machine part which comprises, a frame body; a pair of machine part gripper members each supported on the frame body for sliding in a predetermined direction; a resilient means for energizing the pair of machine part gripper members toward each other; a gripper member movement mechanism for moving the pair of gripper member away from each other against the resilient force of the resilient means; and a gripper member lock mechanism for locking the movement of the gripper members when the gripper members are at a predetermined distance from each other.

The gripper member movement mechanism preferably further comprises a link means including a first arm a first end of which is pivotally joined to one machine part gripper member, and a second arm, a first end of which is pivotally joined to the other machine part gripper member, with the second ends of the first and gripper member, being pivotally joined together; and a link movement mechanism for moving the center section of the link means in the direction perpendicular to the gripper member moving direction and changing the configuration of the link means between an extended configuration in which the first and the second arms are substantially in relative alignment, and an angled configuration in which the first and the second arms form an oblique angle.

BRIEF DESCRIPTION OF THE DRAWINGS

For a better understanding of the invention there is now given a non-limitative description of an embodiment thereof, with reference to the attached drawings, in which.

DETAILED DESCRIPTION OF THE PREFERRED EMBODIMENTS

Figure 1:
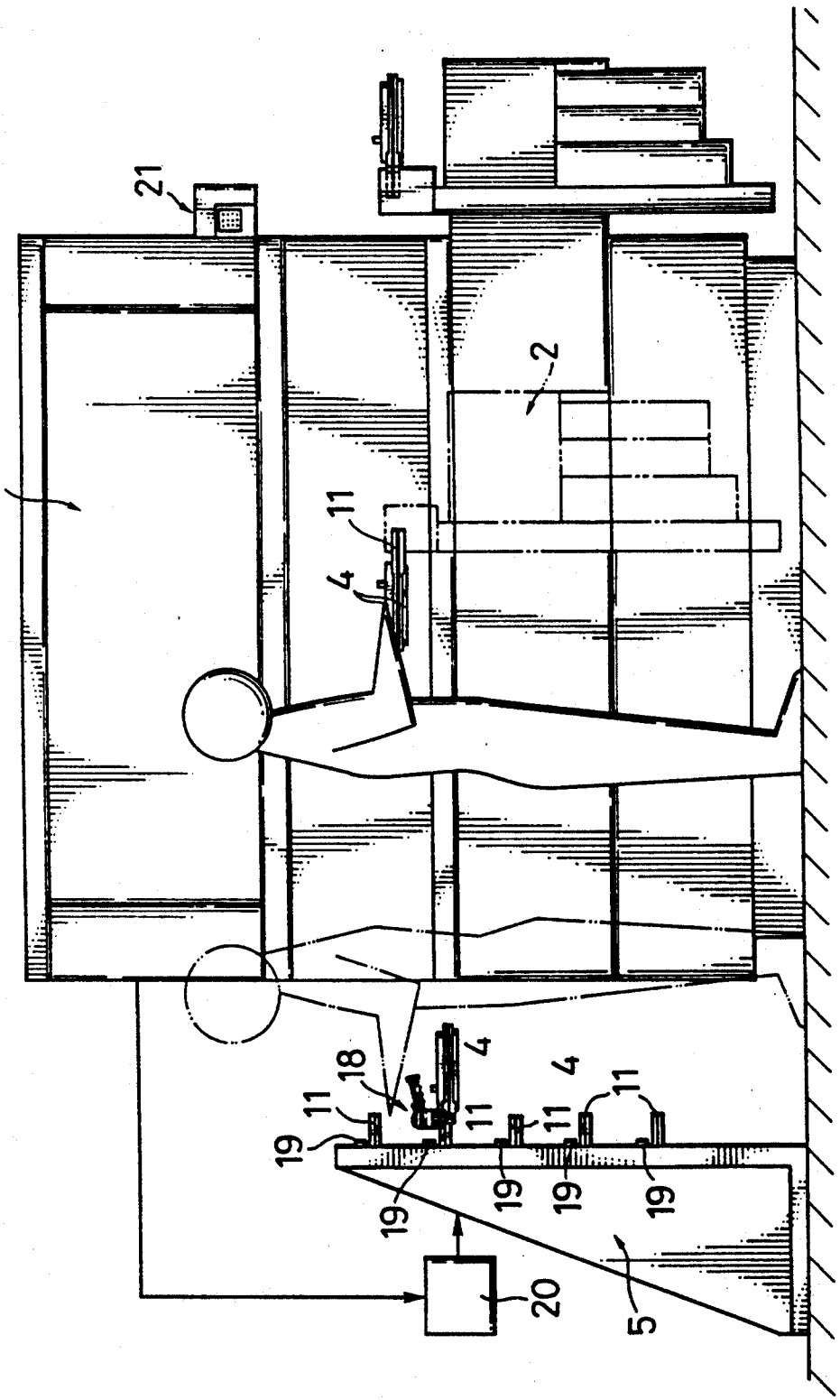
FIG. 1 schematically illustrates a bending press provided with a manipulator having interchangeable fingers and served by a manual system for replacement of the fingers utilizing an embodiment of the apparatus for transferring a machine part according to the present invention.

Referring now to FIG. 1, the reference numeral 1 generally indicates a known bending press served by a manipulator 2 of the type described in the previously cited Japanese Unexamined Patent Publication Tokkai Hei 284,441. The manipulator 2 is provided with a plurality of interchangeable fingers acting as a gripper member 4, which are normally held in a magazine 5 in facing pairs and are selectively mounted on the manipulator 2, again infacing pairs, depending on requirements.

Figure 2:
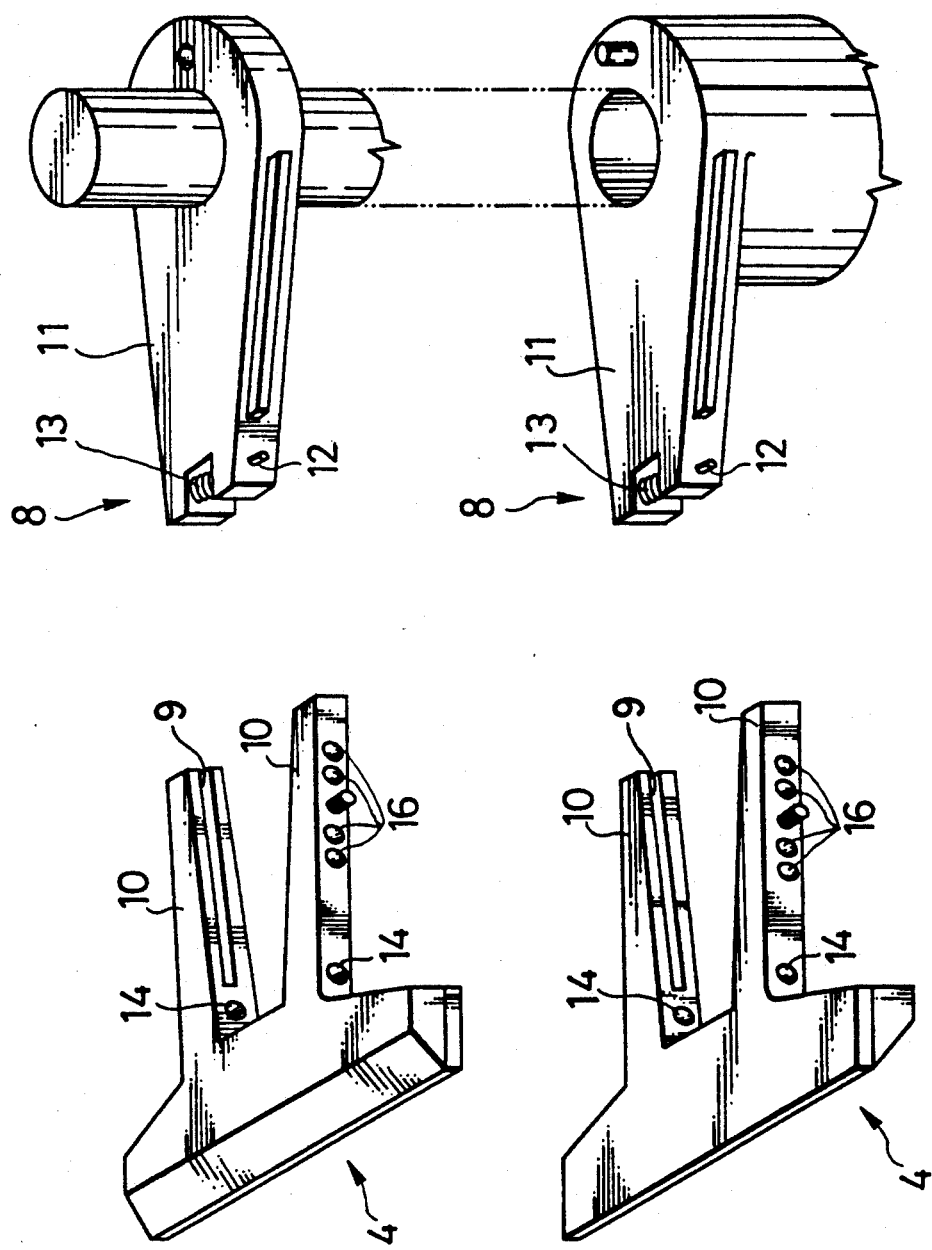
FIG. 2 illustrates, on an enlarged scale, construction of a plate clamping device forming part of the manipulator which is provided with the passive snap-engageable fixing device and is similar to that disclosed in Japanese Unexamined Patent Publication Tokkai Hei 1-284,441.
Figure 3:
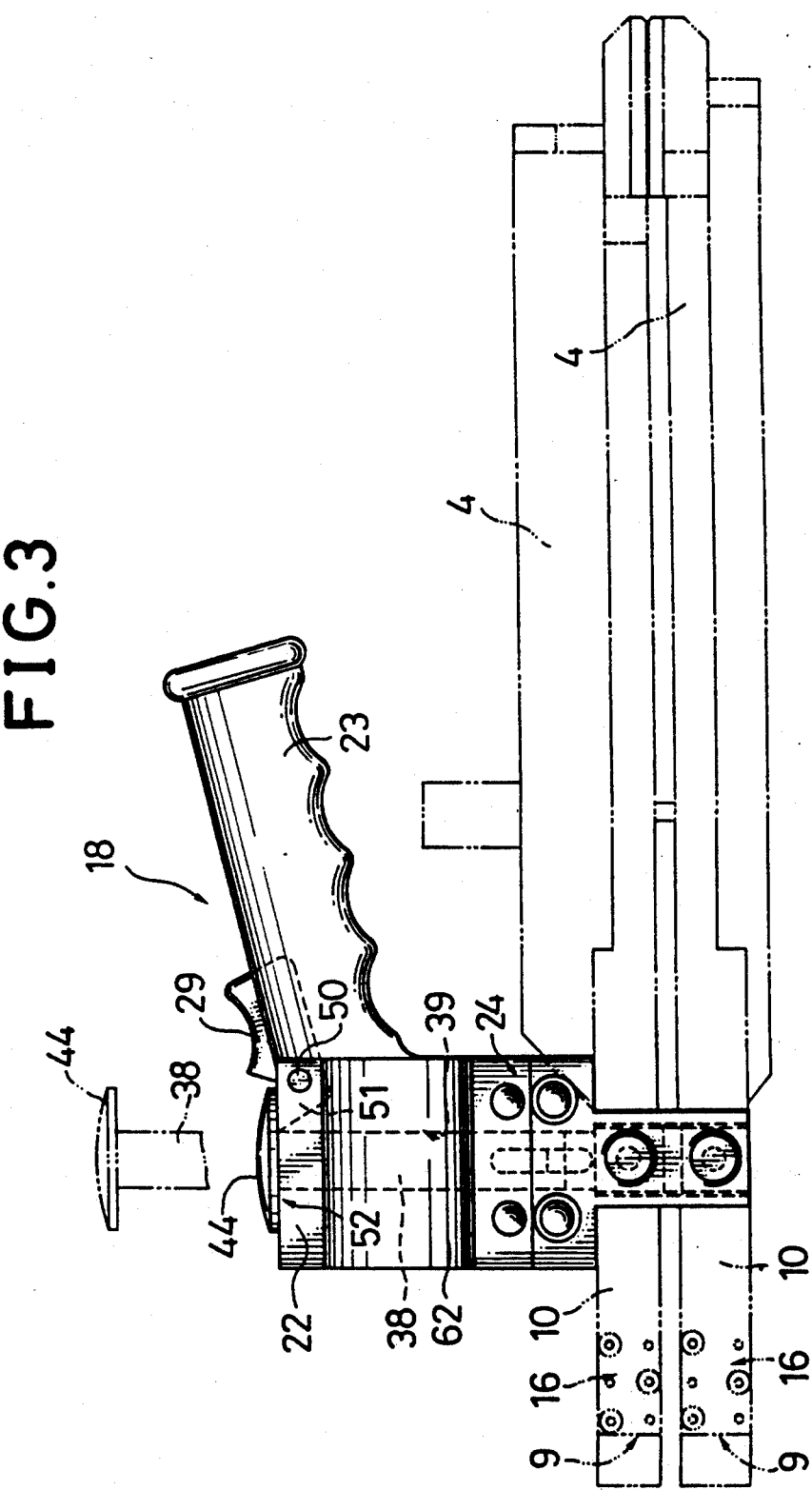
FIG. 3 illustrates on an enlarged scale and in side view the embodiment of the apparatus for transferring a machine part according to the present invention.
Figure 4:
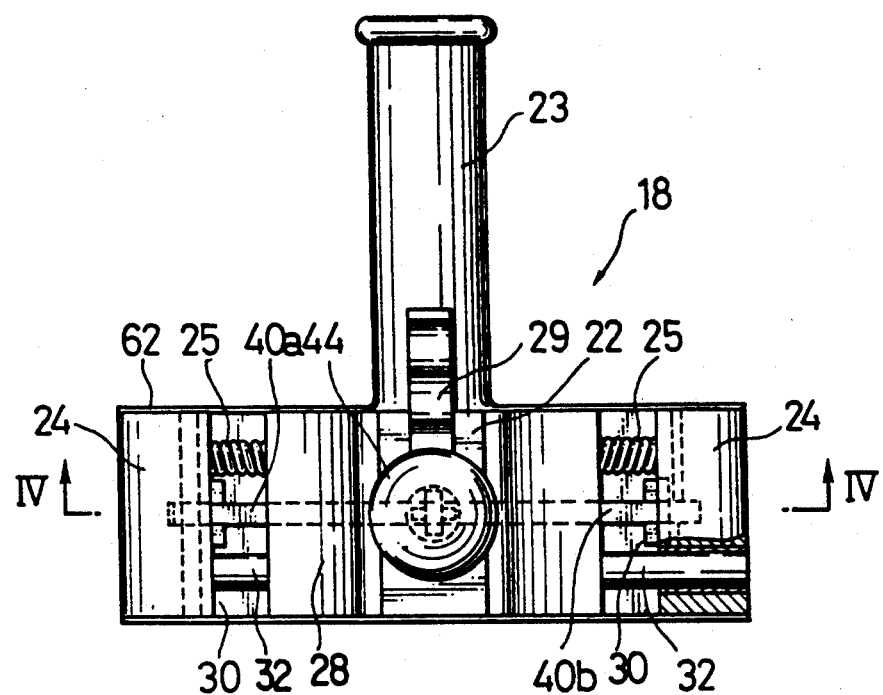
FIG. 4 is a plan view from above of the apparatus for transferring a machine part of FIG. 2.

With reference also to FIGS. 2, 3 and 4, each gripper member finger 4, in the specific example defined by respective flat T-shaped fingers, is fixedly supported on the magazine 5 and on the manipulator device 2 by means of a respective passive snap-engageable securing device 8 (in this case the devices 8 of the manipulator 2 are illustrated). The gripper member 4 is similar to that described in detail in the cited Japanese Unexamined Patent Publication Tokkai Hei 284,441.

Each of the fingers 4 comprises a coupling seat 9 formed in a respective mounting tang 10 projecting rearward from each gripper member 4. A guide or attachment 11 is slidably insertable into the seat 9 of a tang 10 (or of two tangs 10 of two fingers 4 disposed adjacently and facing one another) and is supported by or projects from the manipulator device 2 or from the magazine 5. Respective locking pins 12 project laterally from each guide 11 in such a way as to be retractable thereinto against the action of the resilient means 13. The locking pins 12 are snap-engageable in respective lateral through holes 14 formed in the tangs 10 on the sides of the seats 9.

Preferably, for the purpose of facilitating release of the fingers 4 from the magazine 5, the snap-engageable securing device 8 of the magazine (not illustrated for simplicity) is provided with a locking pin 12 having a greater diameter than that of the holes 14, and a spherical head so that the engagement with the holes 14 takes place only in correspondence with the spherical heads of the locking pins 12.

The tangs 10 are preferably provided externally with respective binary recognition codes 16, for example, obtained by means of threaded holes plugged or otherwise by respective pins, the heads of which can, for example, function as cams for suitable magnetic proximity sensors.

The manual replacement of the fingers 4 on the manipulator 2 with alternative fingers from the magazine 5, and the subsequent deposition into the magazine 5 of the fingers 4 taken from the manipulator 2, for subsequent use, is performed by an operator in the manner schematically illustrated in FIG. 1.

A bending press system illustrated in FIG. 1 comprises a magazine 5 for storing the finger 4 and a machine part transfer apparatus 18 adapted to grip each facing pair of the fingers 4 intended to work together on the manipulator 2. The machine part carriage apparatus 18 is used to transfer the fingers 4 dismounted from the manipulator 2 to the magazine 5 for replacement as another finger 4 removed from the magazine 5 is then mounted on the manipulator 2.

A plurality of illuminable warning lamps acting as an indication means 19 are mounted on the magazine 5. These warning lamps 19 correspond with the guide attachments 11 and are connected to a central control unit 20, which in turn is connected to the bending press control unit 1. These lamps 19, by their illumination under the control of the central control unit 20, are able to indicate to the operator the position in the magazine 5 of the fingers 4 to be withdrawn, and the position of the guide attachment 11 on which the fingers 4 (in the illustrated example, the facing pair of fingers) taken from the manipulator device 2 are to be placed.

For further security, a sensor means 21 can also form part of this bending press system. The sensor means 21 is, for example, a security plate on the press 1 supporting a plurality of magnetic proximity sensors adapted to read the binary codes 16 carried by the individual gripper members 4, and consequently to provide to the central control unit 20 an indication of assent to the continuation of the operation, or else an alarm signal.

Figure 5:
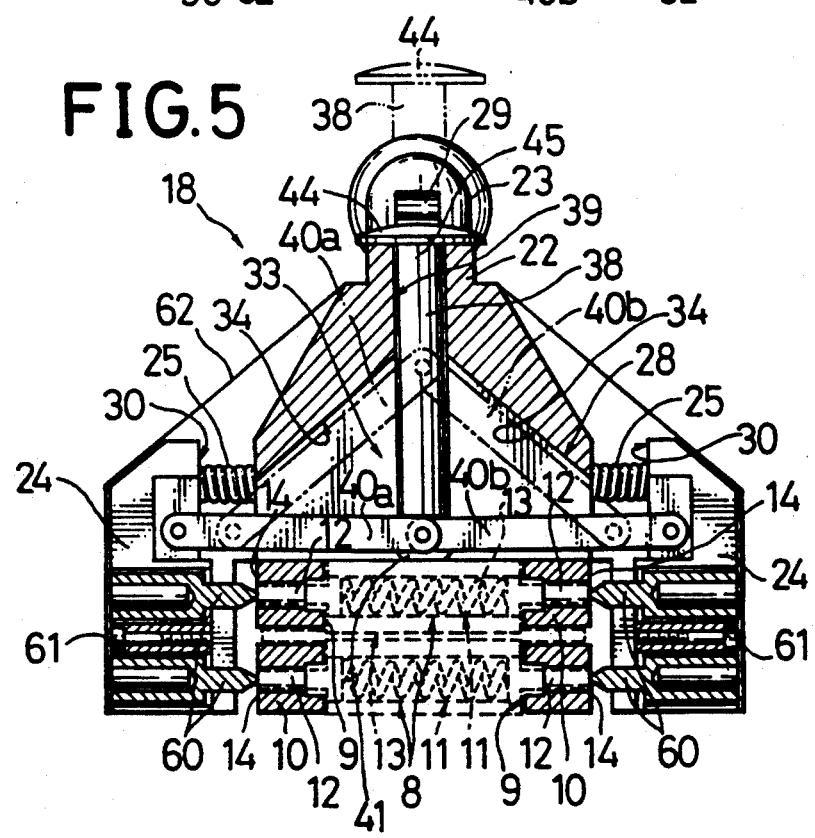
FIG. 5 is a section taken on the line IV—IV in FIG. 4 of the apparatus for transferring a machine part of FIG. 3.

Referring to FIGS. 3, 4, and 5, the machine part transfer apparatus 18 comprises a frame body 22 provided with a projecting pistol grip handle 23, a pair of opposing machine part gripper jaws 24 which are transversely slidably supported by the body 22, and a plurality of resilient means 25 adapted normally (or rather when they are in a state of minimum tension) to maintain the jaws in a closed position, not illustrated, in which the jaws 24 are able to grip a machine part such as the gripper member 4 mounted on the manipulator 2 or on the magazine 5.

Referring in particular to FIG. 5, the machine part transfer apparatus 18 further includes a gripper member movement mechanism 28 for causing the gripper jaws 24 to disengage, and a gripper member lock mechanism for maintaining the jaws 24 locked against the action of the resilient means 25 in a disengaged or open position, which is illustrated by a solid line in FIG. 5. In the open position, the jaws 24 are unable to contact the manipulator fingers 4 to cooperate therewith.

In the embodiment, the gripper jaws 24 are slidably supported by a pair of opposing guides 32 which project transversely from the frame body 22 on the outside thereof. The guides 32 are provided at a position adjacent to an internal, inverted V-shape cavity 33 of the frame body 22 delimited laterally by a pair of opposing inclined faces 34. The resilient means 25 comprises a pair of coil springs working under tension, secured at one end to the outside of the frame body 22 which is defined by a substantially wedge-shape block, for example die cast, and at the other end to an internal face 30 of the respective jaw 24 facing the frame body 22.

The gripper member movement mechanism 28 for moving the gripper jaws 24 comprises an articulated linkage 40a, 40b adapted selectively to assume a stable locking position (illustrated by a solid line in FIG. 5) and an unstable kinematic configuration (illustrated in broken outline in FIG. 5) the linkage 40a,40b includes a first arm member 40a and a second arm member 40b. In the unstable configuration, the springs 25 are free to move by resilient reaction into the configuration of minimum deformation and, consequently, to displace the jaws 24 into the closed working position in which the machine part transfer apparatus 18 is able to grip the manipulator finger 4.

The gripper member movement mechanism 28 includes a rod acting as a link movement mechanism 38 which is axially slidably mounted in a rectilinear seat 39 passing through the frame body 22 and extends in the direction perpendicular to the axial direction of the jaw guides 32. The pair of links 40a, 40b constituting the linkage 40a, 40b and housed movably within the cavity 33 are pivotally connected at the lower end 41 of the rod 38, which is always disposed in the cavity 33 (even when the rod 38 is in the extracted position), and are connected, also by pivots, to the gripper jaws 24

With this arrangement, the rod 38 is movable in the seat 39 between an extracted position, illustrated in broken outline in FIGS. 3 and 5, and a retracted position, illustrated in solid outline in the same figures, in which it projects partly into the interior of the cavity 33.

A knob acting as a lock mechanism or a protrusion section 44 is formed fixedly at an upper end 45 of the rod 38. Hence, when the rod 38 is retracted and the links 40a and 40b are slightly bent downwards (i.e. the center section of the linkage slightly protrudes downwards), the bottom surface 52 of the knob 44 contacts the frame body 22 and the gripper jaws 24 are locked in the disengaged position. Incidentally, in the above position of the rod 38, the links 40a, 40b are disposed substantially in alignment with one another and substantially perpendicular to the rod 38.

The knob 44 permits the operator to exert an axial pressure on the rod 38 in a direction such as to cause its introduction into the seat 39 until the knob 44 comes into contact with the body 22, substantially flush with the handle 23.

The machine part carriage apparatus 18 further includes a release button acting as a disengagement means 29 disposed on the handle 23. The release button 29 disengages the locked rod 38, the linkage 40a, 40b, and the gripper jaws 24 by overcoming the resilient force of the elastic means 25. The release button 29 is rotatably connected to the body 22; in particular, it is rotatable about a pin 50, and includes a tooth shape end 51 which contacts a rear surface 52 of the knob 44 when the rod 38 is in the retracted position and, consequently the knob 44 is in contact with the body 22. Pressure on the push button 29, which functions substantially as a layer, causes the push button 29 to rotate around the pin 50. The pressure is transmitted as an axial thrust exerted by the tooth 51 against the surface 52 of the knob 44 causing a partial extraction of the rod 38 from the seat 39 by a distance equal to the travel of the tooth 51. This result in removal of the links 40a, 40b from the illustrated engagement position (illustrated by the solid line in FIG. 5) and their rotation into an inclined position with respect to the rod 38 (illustrated by the broken line in FIG. 5).

The springs 25, which because of their particular position are under tension when the jaws 24 are displaced towards the disengaged position, are preferably pre-loaded, or rather are selected of a length less than the distance between the jaws 24 and the body 22 when the jaws are in the closed position which is determined by the positions of links 40a, 40b when the rod 38 is in the extracted position. Hence, the springs 25 are also deformed when the jaws 24 are in the closed position, to ensure a reliable gripping action.

At the above closed position of the jaws 24, a possible further approach thereof, with consequent complete relaxation of the springs 25, is impeded by the links 40a, 40b which, as illustrated in broken outline in FIG. 5, abut against the inclined faces 34 which delimit the sides of the cavity 33 (the faces hence act as a abutment section of the present invention).

Finally, in the embodiment, for the purpose of allowing the jaws 24, on the one hand to exert a more secure grip on the manipulator finger 4 and, above all, to actuate release of the passive fixing snap-engageable mechanism 8 upon clamping of the finger 4, the jaws 24 are provided, on the side of the faces 30, with the projecting locking pins 60 adapted to cooperate with the respective retractable locking pins 12 of one or more mechanism 8 of the manipulator 2 or the magazine 5, to disengage the mechanisms 8. Hence, the gripper jaw 24 and the locking pin 60 act as a machine part gripper member of the present invention. In the embodiment, the locking pins 60 are screwed onto the jaws 24; specifically, the base ends of the pins 60 are preferably made as blocks of hardened metal and are secured to the jaws 24 by a plurality of respective screws 61.

The jaws 24, the springs 25 and the body 22 are housed within a protective casing 62 secured to the body 22 and having no supporting function.

In use, when the control program of the bending press 1 requires the replacement of the fingers 4 mounted on the manipulator 2 with others of different characteristics, a signal is sent to the central control unit 20 which activates the warning lamp 19 positioned adjacent to the pair of fingers 4 which is to be mounted on the manipulator 2 and may also activate the warning lamp 19 positioned adjacent to one of the empty attachments 11 intended to receive the fingers 4 at present mounted on the manipulator 2.

An operator, who may be alerted by an acoustic signal, then grips the machine part transfer apparatus 18 with the jaws 24 in the disengaged position, and positions it astride the tangs 10 of the fingers 4 to be dismounted, and then presses the push button 29. This causes partial raising of the rod 38, positions the links 40a, 40b obliquely, and therefore allows the thrust exerted on the jaws 24 by the resilient reaction of the springs 25 to exert a non-zero moment with respect to the links 40a, 40b. Consequently the links 40a, 40b in a condition of kinematic non-equilibrium, are caused to rotate rapidly in such a direction as to completely extract the rod 38 from the seat 39 whilst the jaws 24 clamp together laterally against the tangs 10 of the manipulator finger 4.

The above movements of the jaws 24 also cause the locking pins 60 to be inserted into the holes 14 with consequent expulsion from the hole 14 of the locking pins 12, which are retracted into the interiors of the attachments 11.

At this point, the manipulator fingers 4 mounted on the manipulator 2 are secured to the machine part carriage apparatus 18 and, by release of the securing action, can be lifted away from the associated attachments 11 and be removed from the manipulator 2.

The operator then moves towards the magazine 5 carrying the machine part transfer apparatus 18. During this displacement, the manipulator fingers 4 clamped by the transfer apparatus 18 cannot in any way be accidentally released since the springs 25 maintain the carriage apparatus 18 in a closed state on the manipulator fingers 4. On reaching the magazine 5, the operator displaces the machine part transfer apparatus 18 in such a way as to insert the manipulator fingers 4 that have just been removed, onto the empty support 11 adjacent the activated lamp 19. The operator then activates the gripper member movement mechanism 28 by exerting with one hand pressure on the knob 44 to press the rod 38 into the seat 39.

In order to effect the above action, the operator must overcome the resistance of the springs 25 and must in each case move the rod 38 completely into the retracted position since otherwise the resilient reaction of the spring 25 would return the rod 38 to the extracted position maintaining the jaws 24 clamped on the member 4. When the operator exerts a thrust on the knob 44 sufficient to complete the stroke of the rod 38 towards the retracted position, the links 40a, 40b assume the locked position in which the thrust exerted by the springs 25 on the jaws 24 has a zero moment about the links 40a, 40b, and the jaws 24 are thus locked in the disengaged position. In this position the locking pins 60 recate the holes 14, thus permitting the locking pins 12 of the attachment 11, on which the fingers 4 are located, to snap into the holes 14 under the thrust of the springs 13, whereby the fingers 4 taken from the manipulator 2 are mounted on the magazine.

At this point, the machine part carriage apparatus 18 is again free and open, with the gripper jaws 24 locked in the disengaged position and the springs 25 under tension. The jaws 24 can then be positioned by the operator astride the tangs 10 of another gripper member 4 to be withdrawn from the magazine 5. The fingers 4 are then gripped, displaced and mounted on the manipulator 2 by operating the carriage apparatus 18 exactly as just described. Here, once the gripper member movement mechanism 28 is reactivated to release the fingers 4 to be mounted on the manipulator 2, the carriage apparatus 18 is ready for a new replacement operation.

Before mounting the fingers 4 on the manipulator 2, the operator may check the suitability of the fingers 4 taken from the magazine 5 by holding them against sensor means 21, permitting the machine 1 to read the code 16.

From what has been described, the advantages of the embodiment of the invention are evident: The machine part transfer apparatus 18 has a simple structure, is easily maneuverable and, once it has gripped the fingers (machine part) is able to maintain these fingers securely clamped without risk of accidental release. In fact, the operation of opening the machine part carriage apparatus with the displacement of the jaws 24 to the disengaged position requires a certain force to overcome the resistance of the springs 25, and above all must be displaced completely to its end, otherwise the machine part carriage apparatus recloses automatically. Hence, such an action cannot be executed without a voluntary act on the part of the operator.

As well as the automatic clamping/opening operation the above embodiment of the machine part carriage apparatus further allows the automatic operation of engagement/disengagement of the snap-engageable securing devices 8, which are utiligable in the known manipulator with an automatic gripper member exchange device. Therefore this manipulator 2 can be utilized both in conjunction with the automatic finger exchange devices disclosed in Japanese Unexamined Patent Publication Tokkai-Hei 1-284,441 and with the present manual finger exchange system, with consequent important economies of scale. Finally, in the case of manual finger exchange, the manipulator 2 can also be linked to an overall system of elements (lamps 19, sensors 21) which guide the operator to perform correctly and rapidly the required replacement operation practically without the possibility of errors.

In the above embodiment, the arms 40a and 40b may be alternatively joined by a flexible member such as rubber, plastic, or the like, instead of a pivot pin as illustrated in FIG. 5. Further, the link means may be made out of single plastic material comprising a first and a second arm section each corresponding to one of the arms 40a and 40b of the above embodiment, the link means being bendable at a section between the first and the second arm section.

Further, although in the above embodiment the coil spring 25 is provided in a manner such that the pair of the gripper jaws 24 are urged to engage the machine part, the coil spring 25 may be alternatively provided in a manner such that the gripper jaws 24 are urged to disengage the machine part. In such arrangement, the base frame 22 may be of the shape in which additional extended sections are provided on the base frame 22 of the above embodiment, extending from the base frame shown in FIG. 5 to both sides of the gripper jaws 24. And the coil spring 25 may be provided between one of the gripper jaws 24 and the corresponding extended sections facing the gripper jaw 24 so as to urge the gripper jaws 24 in the disengage direction. This arrangement is advantageous in that it is easy to disengage the gripper jaws 24.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An apparatus for transferring a machine part, comprising:
    a frame body;
    an opposed pair of machine part gripper members each supported on the frame body, the pair of machine part gripper members being apart from each other by at least a predetermined distance so that the machine part is to be put therebetween, and being adapted to move toward and away from each other for gripping and disengaging, respectively, the machine part;
    a resilient means for biasing the pair of machine part gripper members toward each other, for engagement of the gripper members with the machine part;
    a gripper member movement mechanism for moving the pair of gripper members away from each other against the resilient force of the resilient means, for disengagement of the gripper members from the machine part; and
    a gripper member lock mechanism for locking the movement of the gripper members when the gripper members are at said predetermined distance from each other.

2. The apparatus for transferring a machine part of claim 1, wherein the gripper member movement mechanism comprises:
    a link means including a first arm, one end of which is pivotally joined to one of the machine part gripper members, and a second arm, one end of which is pivotally joined to the other machine part gripper member, with the other ends of the first and the second arms being pivotally connected; and
    a link movement mechanism for changing the configuration of the link means between an extended configuration in which the first and the second arms are substantially in relative alignment, and an angled configuration in which the first and the second arms form an oblique angle.

3. The apparatus for transferring a machine part of claim 2, wherein the link movement mechanism comprises a rod member that is supported on the frame body for sliding in a direction perpendicular to the moving direction of the machine part gripper members and the rod member is pivotally joined at one end thereof to the joined portions of the first and the second arms.

4. The apparatus for transferring a machine part of claim 3, wherein the gripper member lock mechanism comprises an engaging means for causing the rod member to engage with the frame body and stopping the sliding movement of the rod member at a position where the link means is in the extended configuration.

5. The apparatus for transferring a machine part of claim 4, wherein the engaging means includes a protruding section formed on the other end of the rod member and the protruding section protrudes in a direction perpendicular to the sliding direction thereof so as to engage with a section of the frame body when the link means is in the extended configuration.

6. The apparatus for transferring a machine part of claim 5 further comprising a disengagement means for disengaging the engagement between the rod member and the frame body by moving the rod member in a disengagement direction.

7. The apparatus for transferring a machine part of claim 6, wherein the frame body is provided with an abutment section for abutting the first and the second arm when the link means is bent in a predetemined angle, to stop the sliding movement of the rod in the disengagement direction.

8. The apparatus for transferring a machine part of claim 7, wherein the frame body includes a grip handle by which an operator grips the apparatus.

9. An apparatus for transferring a machine part which is detachably mounted on a machine, the machine part and the machine being respectively provided with a through hole and a spring loaded pin to be inserted in the through hole from one side thereof for the detachable mounting of the machine part on the machine, the apparatus comprising:

a frame body;

a pair of machine part gripper members each supported on the frame body for sliding in a predetermined direction, with each gripper member including a pin member which is inserted into the through hole of the machine part from the other side thereof for detaching the machine part from the machine;

a resilient means for energizing the pair of machine part gripper members to move toward each other for engagement of the gripper members with the machine part;

a gripper member movement mechanism for moving the pair of gripper members away from each other against the resilient force of the resilient means for disengagement of the gripper members from the machine part; and a gripper member lock mechanism for locking the movement of the gripper members when the gripper members are at a predetermined distance from each other.

10. An apparatus for transferring a pair of fingers of a manipulator for a bending press, comprising:

a frame body;

a pair of machine part gripper members each supported on the frame body for sliding in a predetermined direction, the gripper member being adapted to grip the pair of fingers;

a resilient means for energizing the pair of machine part gripper members to move toward each other for engagement of the gripper members with the machine part;

a gripper member movement mechanism for moving the pair of gripper members away from each other against the resilient force of the resilient means for disengagement of the gripper members from the machine part.

* * * * *